(12) United States Patent
Choi

(10) Patent No.: US 11,504,953 B2
(45) Date of Patent: Nov. 22, 2022

(54) PROTECTIVE GLOVE PROVIDING CONTINUOUS WEBBING PROTECTION

(71) Applicant: Kyong Mi Choi, Vancouver, WA (US)

(72) Inventor: Kyong Mi Choi, Vancouver, WA (US)

( * ) Notice: Subject to any disclaimer, the term of this patent is extended or adjusted under 35 U.S.C. 154(b) by 0 days.

(21) Appl. No.: 15/963,664

(22) Filed: Apr. 26, 2018

(65) Prior Publication Data

US 2018/0310649 A1 Nov. 1, 2018

Related U.S. Application Data

(60) Provisional application No. 62/491,212, filed on Apr. 27, 2017.

(51) Int. Cl.
*A41D 19/015* (2006.01)
*A41D 19/00* (2006.01)
(Continued)

(52) U.S. Cl.
CPC .......... *B32B 27/12* (2013.01); *A41D 19/0006* (2013.01); *A41D 19/01505* (2013.01);
(Continued)

(58) Field of Classification Search
CPC ........ A41D 19/01523; A41D 19/01547; A41D 19/01558; A41D 19/0006; A41D 19/01529; A41D 19/01505; A41D 27/28; A41D 27/22; A41D 2400/80; A41D 2600/20; B32B 27/32; B32B 27/40; B32B 27/08; A63B 71/143
(Continued)

(56) References Cited

U.S. PATENT DOCUMENTS 4,094,014 A * 6/1978 Schroeder ........ A41D 19/01505
2/161.8
5,682,613 A * 11/1997 Dinatale ............ A41D 19/0006
2/168
(Continued)

OTHER PUBLICATIONS

International Search Report and Written Opinion for PCT/US2018/029583 dated Jul. 12, 2018, 8 pages.
(Continued)

*Primary Examiner* — Nathan E Durham
*Assistant Examiner* — Abby M Spatz
(74) *Attorney, Agent, or Firm* — Sheppard, Mullin, Richter & Hampton LLP

(57) ABSTRACT

Embodiments disclosed herein include devices and methods pertaining to gloves for protection of a wearer's hand. According to various embodiments of the disclosed technology, disclosed is a glove. The glove may include a glove body comprising a cuff portion, a palm portion, a thumb portion, and finger portions. The plurality of finger portions comprises at least one of an index finger portion, a middle finger portion, a ring finger portion, and a pinky finger portion. The glove may include a plurality of impact disbursement pads. The impact disbursement pads comprise finger pads, knuckle pads, metacarpal pads, and a thumb pad. The glove may include a webbing portion and knuckle pads. The glove body is formed from a first material, the webbing portion is formed from a second material, and the impact disbursement pads are formed from a third material.

12 Claims, 6 Drawing Sheets

(51) Int. Cl.
   B32B 27/12    (2006.01)
   B32B 27/32    (2006.01)
   B32B 27/40    (2006.01)
   B32B 27/08    (2006.01)
   A41D 31/14    (2019.01)
   A41D 31/102   (2019.01)
   A41D 27/28    (2006.01)
   A41D 27/22    (2006.01)

(52) U.S. Cl.
   CPC . *A41D 19/01523* (2013.01); *A41D 19/01529* (2013.01); *A41D 31/102* (2019.02); *A41D 31/14* (2019.02); *B32B 27/08* (2013.01); *B32B 27/32* (2013.01); *B32B 27/40* (2013.01); *A41D 19/01558* (2013.01); *A41D 27/22* (2013.01); *A41D 27/28* (2013.01); *A41D 2400/80* (2013.01); *A41D 2600/20* (2013.01); *B32B 2437/02* (2013.01)

(58) Field of Classification Search
   USPC .............................................. 2/16, 161.1, 20
   See application file for complete search history.

(56) References Cited

U.S. PATENT DOCUMENTS

| | | | | |
|---|---|---|---|---|
| 7,937,773 | B1* | 5/2011 | Kleinert | A41D 19/01523 2/159 |
| 9,677,855 | B2* | 6/2017 | VanErmen | A41D 19/0096 |
| 10,085,498 | B2* | 10/2018 | Fitzgerald | A41D 19/01505 |
| 2007/0061943 | A1* | 3/2007 | Kleinert | A63B 71/143 2/159 |
| 2008/0083048 | A1* | 4/2008 | Morrow | A63B 71/143 2/16 |
| 2008/0109934 | A1* | 5/2008 | Widdemer | A41D 19/01523 2/159 |
| 2009/0044306 | A1* | 2/2009 | Lamson | A41D 19/01523 2/16 |
| 2012/0131714 | A1* | 5/2012 | Copeland | A63B 71/143 2/16 |
| 2013/0180027 | A1* | 7/2013 | Rock | A41D 19/01505 2/167 |
| 2014/0143924 | A1* | 5/2014 | Rusakov | A63B 71/143 2/16 |
| 2014/0173799 | A1 | 6/2014 | Vanermen | |
| 2014/0215685 | A1* | 8/2014 | Bush | A41D 19/01523 2/161.1 |
| 2015/0202521 | A1* | 7/2015 | Abdelmalek | A41D 19/01523 2/20 |
| 2015/0305416 | A1* | 10/2015 | Chorne | A63B 71/143 2/16 |
| 2017/0175324 | A1* | 6/2017 | Aurora | D06M 11/01 |
| 2018/0154243 | A1* | 6/2018 | Kiernan | A63B 71/143 |
| 2018/0303176 | A1* | 10/2018 | Lim | G06F 3/014 |

OTHER PUBLICATIONS

Cestus, Deep III Pro 3207. Webpage (online). Mar. 9, 2017 (retrieved from internet on Jun. 25, 2018]. htpps://cestuline.com/products/deep-iii%C2%AE-pro , entire document. see p. 5 of ISA/237, 6 pages.

* cited by examiner

| Smallest Diameter of pin fulfilling test condition (1) | 5 mm |
|---|---|
| Smallest Diameter of pin fulfilling test condition (1) | 5 mm |
| Smallest Diameter of pin fulfilling test condition (1) | 5 mm |
| Smallest Diameter of pin fulfilling test condition (1) | 5 mm |
| Smallest Diameter of pin fulfilling test condition (1) | 5 mm |
| Performance Level | 5 |

FIG. 5

| | | |
|---|---|---|
| Strength Transmitted Under 5 Joules of Energy – Test 1 | <= 9 kN | 6.7 kN |
| Strength Transmitted Under 5 Joules of Energy – Test 2 | <= 9 kN | 6.8 kN |
| Strength Transmitted Under 5 Joules of Energy – Test 3 | <= 9 kN | 6.2 kN |
| Strength Transmitted Under 5 Joules of Energy – Test 4 | <= 9 kN | 6.5 kN |
| Mean Strength Transmitted Under 5 Joules of Energy | <= 7 kN | 6.6 kN |

PROTECTIVE GLOVE PROVIDING CONTINUOUS WEBBING PROTECTION

TECHNICAL FIELD

The present technology relates generally to protective gloves, and more specifically, to protective gloves suitable for protecting a wearer's hand from pinches, cuts, and punctures.

BACKGROUND

Traditional protective gloves are manufactured to strike a balance between ease of use and protection. Gloves may afford the wearer greater dexterity, but sacrifice protection. Conversely, some gloves may provide ample protection, but sacrifice dexterity. Gloves manufactured for use by workers in the oil and gas industry, as well as other industries, may be manufactured with discontinuous protective portions. Such islands of protection in otherwise unprotected areas leave gaps between the islands where protection is nonexistent or greatly diminished. Such gaps can lead to increased susceptibility to cuts, punctures, and other types of injuries.

BRIEF SUMMARY OF EMBODIMENTS

According to various embodiments of the disclosed technology, disclosed is a glove for protection of a wearer's hand. The glove may have a proximal end and a distal end and a dorsal side and a palmar side. The glove may include a glove body including a cuff portion, a palm portion, a thumb portion, and a plurality of finger portions. The plurality of finger portions includes at least one of an index finger portion, a middle finger portion, a ring finger portion, and a pinky finger portion. The glove may include a plurality of impact disbursement pads located on the dorsal side of the glove. The plurality of impact disbursement pads includes finger pads, knuckle pads, metacarpal pads, and a thumb pad. The glove may include a webbing portion stretching continuously from the thumb pad to the metacarpal pads and the knuckle pads. The glove body may be formed from a first material, the webbing portion may be formed from a second material, and the plurality of impact disbursement pads may be formed from a third material.

BRIEF DESCRIPTION OF THE DRAWINGS

FIG. 5 illustrates a table depicting an EN 420 dexterity test using an exemplary glove, in accordance with one embodiment of the technology disclosed herein FIG. 6 illustrates a table depicting an EN 388 impact absorption test using an exemplary glove, in accordance with one embodiment of the technology disclosed herein.

The figures are not intended to be exhaustive or to limit the technology to the precise form disclosed. It should be understood that the disclosed technology can be practiced with modification and alteration, and that the disclosed technology be limited only by the claims and the equivalents thereof.

DETAILED DESCRIPTION

Embodiments of the technology disclosed herein are directed toward protective gloves. In various embodiments, the protective gloves are suitable for providing enhanced impact, puncture, cut, and pinch protection. In some embodiments, the gloves may provide increased protection for workers in many fields, including pipe fitting, rigging, carpentry, ironworking, rebar handling, mining, and other industries. In embodiments, the gloves may further include features to increase the dexterity and grip of a wearer with respect to other gloves. In embodiments, the gloves may further include aspects to enhance ease of use.

Figure 1:
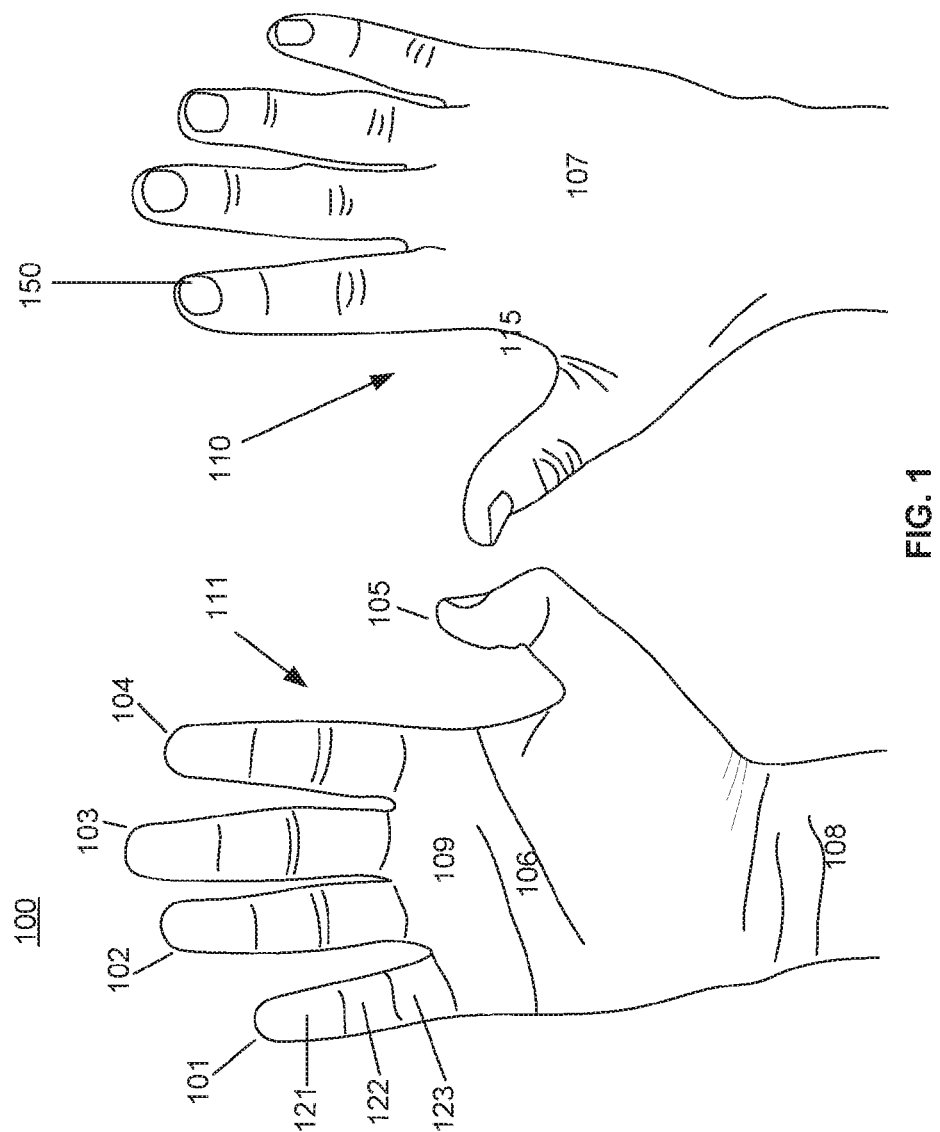
FIG. 1 illustrates a pair of human hands, in accordance with one embodiment of the technology disclosed herein.

FIG. 1 illustrates a pair of human hands. Throughout the following description, the structure, fit, and function of gloves consistent with the present disclosure may be described with respect to, and with reference to, the anatomy of a wearer's hand or hands. FIG. 1 illustrates various aspects of a wearer's hand 100. Hands typically include fingers, index finger 104, middle finger 103, ring finger 102, pinky finger 101, and an opposable thumb 105. Each of the fingers includes three phalanges, proximal phalange 123, intermediate phalange 122, and distal phalange 121. Thumb 105 includes two phalanges, proximal phalange 123 and distal phalange 121. Each finger and thumb 105 includes a nail 150.

Hands further include palm region 106, dorsal region 107, and wrist region 108. Each finger and thumb 105 also includes palmar side 111 and dorsal side 110. Palmar side 111 of the fingers and thumb 105 is contiguous with palm region 106 of hand 100 and dorsal side 110 of the fingers and thumb 105 is contiguous with dorsal region 107 of hand 100. Palm region 106 includes grip region 109 and grip saddle region 115. Grip region 109 is the upper-area of palm region 106 and forms an area that makes direct contact with an object when it is held by a close-gripped hand 100. Web region 115 is the skin region 106 that stretches between the index finger 104 and the thumb 105 and forms an area that makes direct contact with an object when it is held by a close-gripped hand 100.

Figure 2:
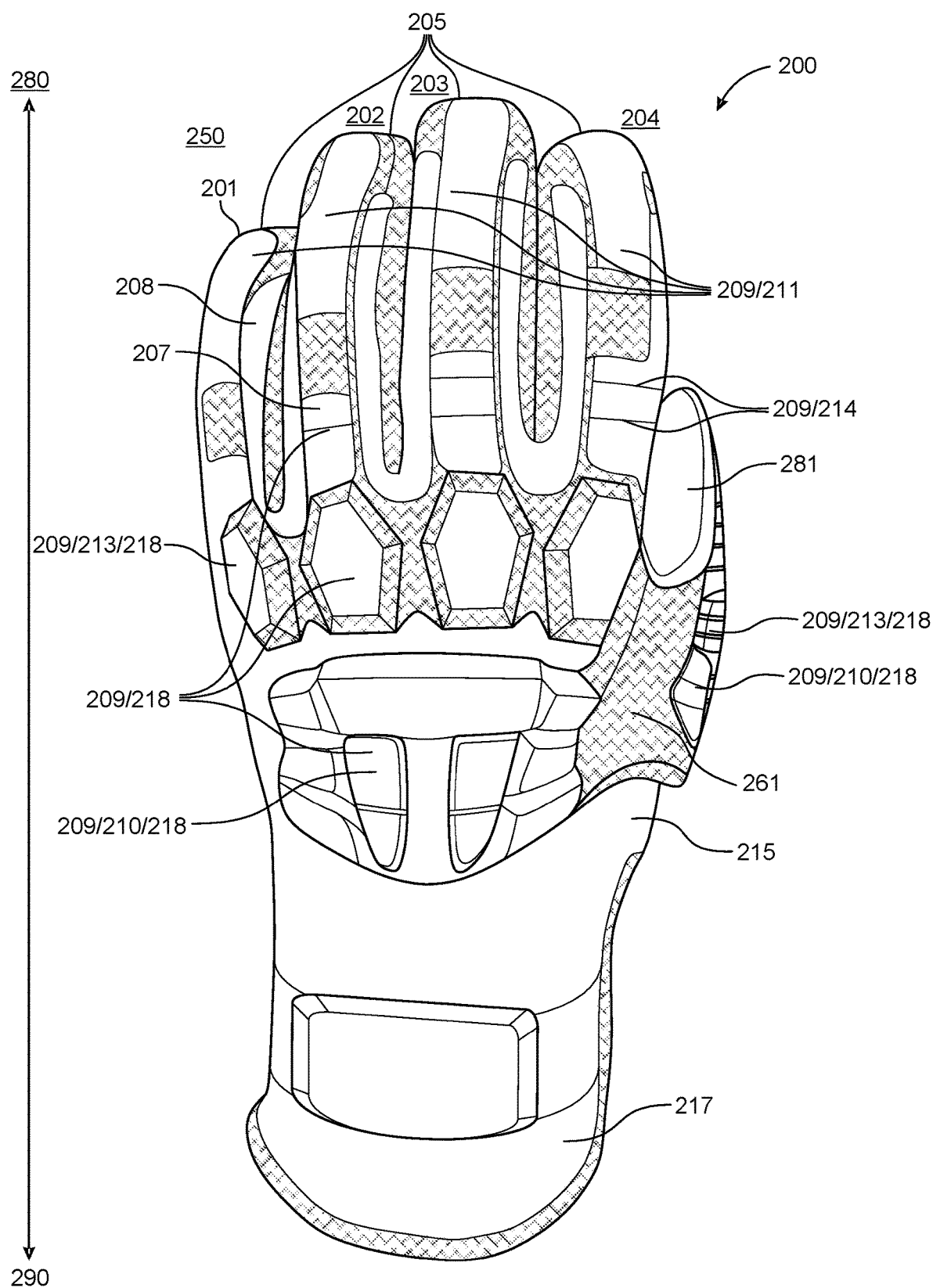
FIG. 2 illustrates a dorsal view of an exemplary glove, in accordance with one embodiment of the technology disclosed herein.

FIG. 2 illustrates a dorsal view of a glove body 200 of a protective glove 250 consistent with the present disclosure. Glove 250 may include glove body 200 having a proximal end 290 closer to the arm of the wearer when glove 250 is properly worn and a distal end 280 further from the arm of the wearer when glove 250 is properly worn. Glove body 200 may include cuff portion 217, dorsal portion 215, thumb portion 281, and finger portions 205. Finger portions 205 may include index finger portion 204, middle finger portion 203, ring finger portion 202, and pinky finger portion 201. Each finger portion 205 may include dorsal side 207, palmar side 225 (shown in FIG. 3), and two forchettes 208 joining the dorsal side 207 and the palmar side 225. Cuff portion 217 generally corresponds to a wrist region 108 of hand 100 of a wearer, dorsal portion 215 generally corresponds to a dorsal region of hand 100 of a wearer, and finger portions 205 generally correspond to the fingers of hand 100. Glove body 200 may be constructed of flexible materials, such as nylon, microfiber, cotton, wool, leather, spandex, Nomex® (or flame resistant fabrics), HPPE (high performance polyethylene), HMDPE (high molecular density polyethylene), and any other material suitable for a glove body.

In some embodiments, glove body 200 may be constructed of an air permeable material. Such a material may be selected to provide air permeability sufficient to keep a wearer's hands comfortable in warmer environments. Examples of air permeable materials include nylon, cotton, microfiber, and wool. Examples of materials that are not sufficiently air permeable to provide ventilative cooling may include leather, unventilated rubber materials, unventilated silicone, and others.

In some embodiments, glove body 200 may include a breathable material. Breathable materials permit the passage of water vapor. Breathable materials may be waterproof; breathable materials may permit the passage of water vapor while denying the passage of select liquids, including water. Such materials permit sweat to exit glove 250 in vaporous form while preventing liquid water from reaching hand 100 of the wearer. Breathability in glove body 200 may allow a wearer's hands to remain comfortable inside the gloves when they start to sweat.

FIG. 2 also illustrates some of the protective safety aspects consistent with some embodiments of glove 250, including impact disbursement pads 209, and webbing portion 261, both of which may be located on glove body 200.

Impact disbursement pads 209 may be positioned across various regions of the dorsal portion 215 of glove 250 and dorsal side 207 of the fingers. Impact disbursement pads 209 may be positioned to provide protection to vulnerable portions of hand 100 including the metacarpal region of hand 100, dorsal side 207 of the fingers and thumb 105 from knuckle to fingertip, and the knuckles of the fingers. Such protection may be provided by metacarpal pads 210, finger pads 211, thumb pads 212, and knuckle pads 213. Impact disbursement pads 209 may include an impact resistant material providing additional protection beyond that of glove body 200. The impact resistant material of the impact disbursement pads 209 may be a material different than that of glove body 200. In some embodiments, impact disbursement pads 209 may include a material that is stiffer and stronger than glove body 200. Consequently, the addition of impact disbursement pads 209 may provide additional protection.

In some embodiments, impact disbursement pads 209 may include a material that is thicker than the material of glove body 200. For example, impact disbursement pads may range in thickness from 1 mm to 7 mm.

Impact disbursement pads 209 may include impact disbursement pad segmentation gaps 214 positioned to permit the flexing of various portions of glove body 200. For example, segmentation gaps 214 may be positioned throughout the finger pads 211 and thumb pads 212, as shown in FIG. 2.

In some embodiments, impact disbursement pads 209 may include a TPE, TPR, or other rubber materials. Such materials may provide enhanced impact, puncture, cut, and pinch protection in comparison to a material of the remainder of glove body 200. TPE, TPR, and silicone materials exhibit thermoplastic behavior under high heat conditions and may provide sustained protection in high heat conditions. These materials may be resistant to conductive heat at temperatures up to approximately 350° F.

In some embodiments, impact disbursement pads 209 may include ventilated portions 218. Any portion of metacarpal pads 210, finger pads 211, thumb pad 212, and knuckle pads 213 may be ventilated portion 218, as illustrated in FIG. 2. Ventilated portions 218 may include one or more holes that extend through the impact disbursement pad 209 such that the material of glove body 200 underneath the impact disbursement pad 209 where the ventilated portions 218 are located is in fluid communication with the air surrounding glove 250. Ventilated portions 218 may permit increased airflow through glove 250 by permitting air to flow through the uncovered glove body 200 and the impact protected portions of glove body 200.

In some embodiments, portions of glove 250 that cover the web region 115 of the wearer's hand 100 between the thumb and index finger may be protected by webbing portion 261 including a continuous flexible material. Webbing portion 261 of glove 250 may be required to provide flexibility in multiple different directions. In some designs, such flexibility may be facilitated by segmented islands of protective material connected by less protective and more flexible materials. Although this type of design may allow the wearer flexibility, such islands may lead to vulnerabilities in the spaces between the islands. Continuous coverage constructed from a thick and stiff material may not provide enough flexibility in this area to accommodate a wearer's ability to grasp objects and maintain dexterity. Accordingly, in embodiments described herein, these problems may be overcome by webbing portion 261, which may include a flexible material continuously spanning the location between thumb pad 212, metacarpal pad 210, and knuckle pad 213. Webbing portion 261 may be located such that it provides continuous coverage between thumb pad 212, metacarpal pad 210, and knuckle pad 213 with no gaps or exposed portions of glove body 200.

The continuous flexible protective material of webbing portion 261 may include a material providing impact, cut, puncture, and pinch resistance beyond that which is provided by the material of glove body 200. The material of webbing portion 261 may be stiffer, thicker, stronger, and less prone to cutting, tearing, or puncture than the material of glove body 200. The continuous flexible protective material of webbing portion 261 provides an alternative to webbing protection of traditional gloves. In some traditional gloves, this portion of glove 250 does not include any additional protection at all, and includes material that is the same or similar to the material of glove body 200 in providing impact, cut, puncture, and pinch protection. In some traditional gloves, islands of thicker more protective material are placed in this region of glove 250. Such designs provide discontinuous protection and create vulnerabilities in the gaps between the islands. In contrast, as illustrated in FIG. 2, webbing portion 261 provides continuous, uninterrupted, impact, cut, puncture, and pinch protection from a base of thumb pad 212 and spanning across web area 115 of a wearer's hands to knuckle pad 213 and metacarpal pad 210.

The flexible continuous material of webbing portion 261 may include Spandex, Nomex® (or flame resistant fabrics), HPPE, HMDPE, and other flexible protective materials.

The combination of flexibility and protection provided in the webbing portion 261 is an unexpected result in view of traditional designs as shown in the results of tests performed on the gloves. FIG. 5 illustrates a table showing the results of an EN 420 dexterity test performed using the gloves described herein. The EN 420 dexterity test measures the smallest diameter of a pin that may be picked up with a gloved hand 3 times in 30 seconds. Diameters in the test range from 11 mm to 5 mm. A 5 mm result is thus the highest score indicating the highest tested dexterity. The dexterity test results indicate excellent levels of dexterity achieved with the continuous flexible web protection. Such high dexterity levels are unexpected in a glove design that provides continuous and unbroken protection from the thumb, across the web region, and covering the metacarpal, knuckle, and finger regions of hand 100.

FIG. 6 illustrates a table showing the results of an EN 388 impact absorption test. The results shown indicate impact absorption results across the impact disbursement pads 209 arranged across the back of the knuckles of glove 250. Protective webbing portion 261 may be constructed from the same material and have a same thickness as the material of the disbursement pads 209, and thus may be expected to have similar impact disbursement scores. As shown in Table 2, the impact disbursement values of the gloves protective areas achieves a maximum rating (i.e., less than 9 kN of force transmitted under a test energy of 5 joules).

Traditional glove materials may trade flexibility for protection, and vice versa. More flexible materials typically provide insufficient protection and more protective materials provide insufficient flexibility. Thus, the combination of flexibility and protection provided by the webbing portion 261 is an unexpected result and provides increased protection and flexibility in the web areas of hand 100 without the island effect created by using stiffer pads attached to a more flexible material.

In some embodiments, the continuous flexible protective material of webbing portion 261 may include ventilation holes. Ventilation holes in the continuous flexible protective material may extend through webbing portion 261 so as to create fluid communication between the air surrounding glove 250 and glove body 200 located underneath webbing portion 261. Such ventilation holes may increase the comfort of the wearer.

Figure 3:
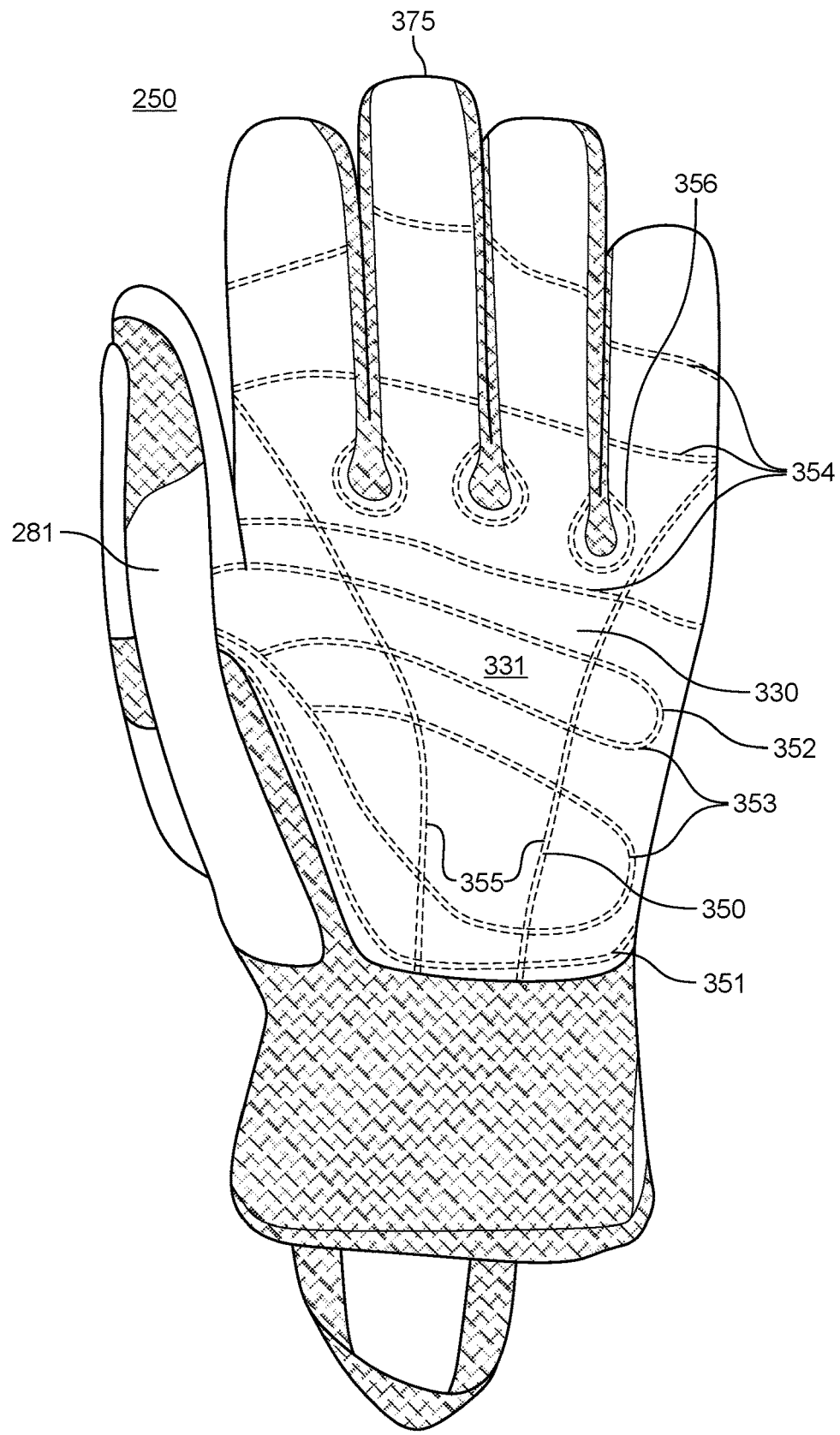
FIG. 3 illustrates a palmar view of an exemplary glove, in accordance with one embodiment of the technology disclosed herein.

FIG. 3. illustrates a palmar view of glove body 200 of protective glove 250 consistent with the present disclosure. Further to FIG. 2, FIG. 3 illustrates thumb portion 281 of glove body 200 and palm protection portion 330 applied to glove body 200.

Palm protection portion 330 may be provided to cover the palm of glove body 200 to provide abrasion resistance, wear resistance, enhanced grip, and other enhancements. In some embodiments, palm protection portion 330 may have multiple layers. Palm protection portion 330 may include a grip enhancing layer 331. Grip enhancing layer 331 may be the outermost layer. Grip enhancing layer 331 may include polyurethane or other suitable materials. Grip enhancing layer 331 may include a grip enhancing coating (not shown) to improve the grip of the wearer on dusty, oily, wet, muddy or otherwise slippery surfaces. In some embodiments, palm protection portion 330 may include a cut resistant layer (not shown) between grip enhancing layer 331 and glove body 200. A cut resistant layer may include materials such as high molecular density polyethylene or HPPE. The cut resistant layer may provide improved resistance to cuts and punctures as compared to glove body 200 and grip enhancing layer 331.

Palm protection portion 330 may be attached to glove body 200 by stitching 350. Stitching 350 may be designed to increase durability in high stress areas of the glove palm. Stitching 350 may include a double stitching pattern as illustrated in FIG. 3. Stitching 350 may include outer stitching 351 located at the edges of the palm protection portion 330 and extending from thumb portion 281 across the base of the palm protection portion 330 and up to the pinky finger portion 201. Stitching 350 may include palm stitching 352 configured in a sinuous pattern across the palm of glove 250. Palm stitching 352 may include one or more stitching loops 353 from the thumb portion 281 across the palm and back towards the thumb portion. As illustrated in FIG. 3, palm stitching may include two stitching loops 353. Stitching 350 may include one or more lateral stitching bands 354 stretching across one or more the palm or fingers of the palm protection portion 330. Stitching 350 may include one or more longitudinal stitching bands 355 stretching from the proximal portion 280 to the distal portion 290 of the palm protection portion 330. Stitching 350 may further include finger base stitching 356 at the base of the fingers, in a circular pattern around the region where the fingers are differentiated from each other. Any or all of the stitching described may be single or double stitching pattern. Stitching 350 may include any or all of the above stitching patterns to enhance durability of glove 250.

Also as illustrated in FIG. 3, palm protection portion 330 may be constructed of a single piece spanning the entirety of the palm, from wrist to fingertip without introducing any gaps in coverage. Single piece protection of this nature adds durability to glove 250 as well as continuous protection.

In some embodiments, palm protection portion 330 may include a touchscreen zone 375 located on one or more of fingers. Touchscreen zone 375 may include a material selected for touchscreen operation. Thus, while wearing glove 250, the wearer may use touchscreen 375 to operate touchscreen devices including capacitive, resistive, or other touchscreen devices.

Figure 4:
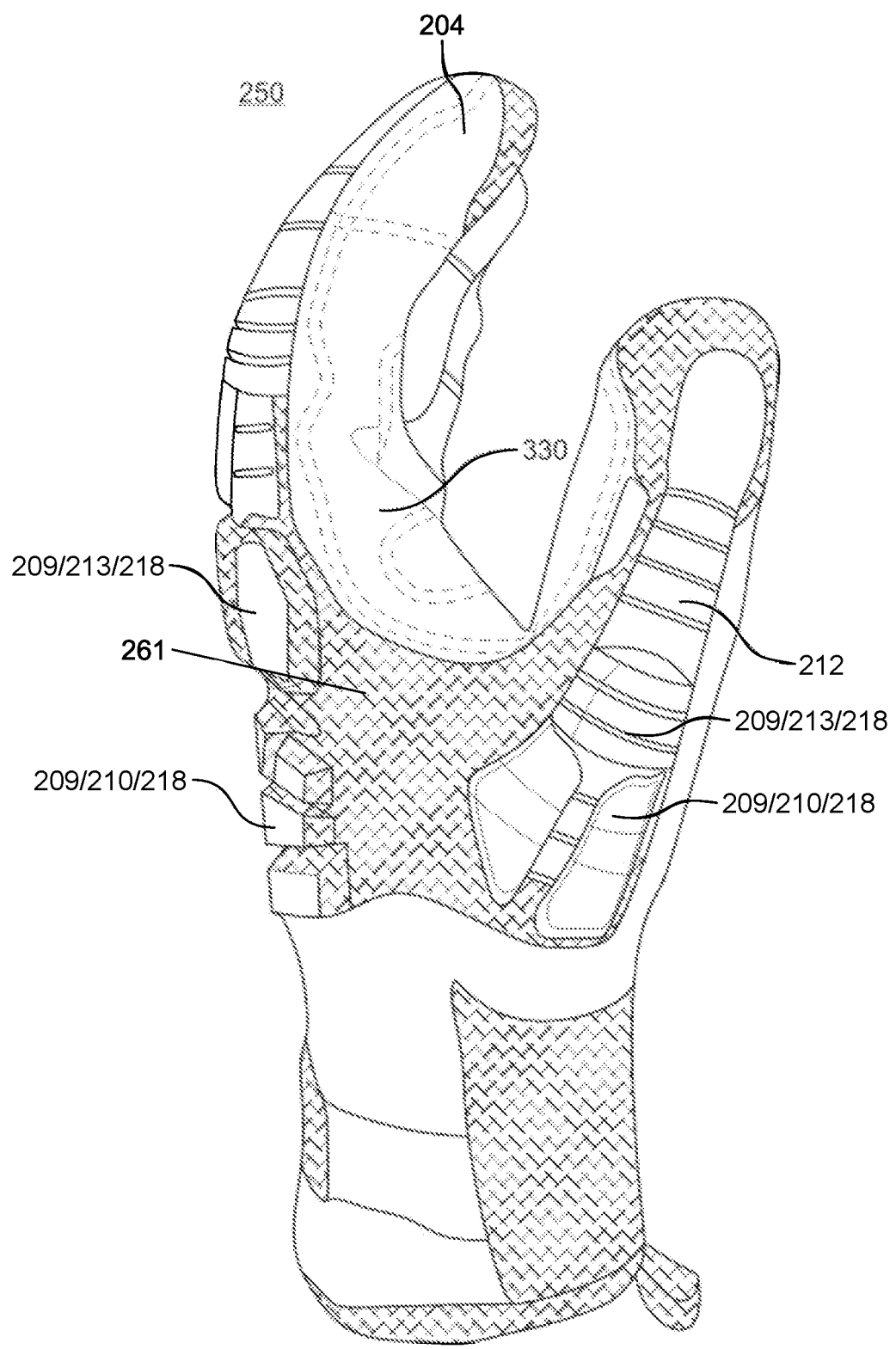
FIG. 4 illustrates a side view of an exemplary glove, in accordance with one embodiment of the technology disclosed herein.

FIG. 4 illustrates a side view of glove 250. As illustrated in FIG. 4, palm protection portion 330 may wrap around a side of index finger portion 204 to provide enhanced protection and grip on this portion of the finger. Palm protection portion 330 may similarly overwrap the thumb of glove 250, providing enhanced protection and grip to this area as well. Palm protection portion 330 may further wrap around web region 115 of glove body 200 to meet webbing portion 261. Thus, webbing portion 261 may, in some embodiments, provide continuous, uninterrupted protection over the web region of a wearer's hand 100 from thumb pad 212 and palm protection portion 330 to metacarpal pad 210 and knuckle pad 213.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent names other than those depicted herein can be applied to the various partitions.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A glove for protection of a wearer's hand, the glove having a proximal end and a distal end and a dorsal side and a palmar side, the glove comprising:
    a glove body comprising a cuff portion, a palm portion, a thumb portion, and a plurality of finger portions, wherein the plurality of finger portions comprise at least one of an index finger portion, a middle finger portion, a ring finger portion, and a pinky finger portion;
    a plurality of impact disbursement pads located on the dorsal side of the glove, the plurality of impact disbursement pads comprising a thumb knuckle pad, a thumb metacarpal pad, an index knuckle pad, an index metacarpal pad, a middle knuckle pad, a middle metacarpal pad, a ring knuckle pad, a ring metacarpal pad, a pinky knuckle pad, and a pinky metacarpal pad, wherein the plurality of impact disbursement pads comprise ventilated portions throughout the impact disbursement pads, wherein the plurality of impact disbursement pads comprise segmentation gaps that break up individual ones of the plurality of impact disbursement pads on an individual pad; and
    a webbing material continuously uninterruptedly spanning an area bounded by the thumb knuckle pad, the thumb metacarpal pad, the index knuckle pad, and the index metacarpal pad, wherein the webbing material is directly attached to the thumb knuckle pad, the thumb metacarpal pad, the index knuckle pad, and the index metacarpal pad; and
    wherein the glove body is formed from a first material, the webbing material is a second material, and the plurality of impact disbursement pads are formed from a third material; wherein the second material is a flexible material comprising ventilation holes; and wherein the first, second, and third materials are different materials.

2. The glove of claim 1, wherein the webbing material is configured to provide protection to a webbing of the wearer's hand when the glove is worn.

3. The glove of claim 1, wherein at least portions of the second material comprise the ventilation holes permitting air flow between the glove body and an exterior of the glove.

4. The glove of claim 1, wherein at least portions of the third material comprise ventilation holes permitting air flow between the glove body and an exterior of the glove.

5. The glove of claim 1, wherein the third material comprises one of a thermoplastic elastomer (TPE), a thermoplastic rubber (TPR), a silicon material, and a rubber material.

6. The glove of claim 1, wherein the second material comprises one of Spandex, Nomex, flame resistant fabric, high performance polyethylene (HPPE), and high molecular density polyethylene (HMDPE).

7. The glove of claim 1, further comprising a palm protection portion covering the palm of the glove body.

8. The glove of claim 7, wherein the palm protection portion comprises a grip enhancing outer layer and a cut resistant inner layer, the grip enhancing outer layer comprising polyurethane, and the cut resistant inner layer comprising high molecular density polyethylene.

9. The glove of claim 8, wherein the grip enhancing outer layer comprises a grip enhancing coating applied to an exterior of the grip enhancing outer layer.

10. The glove of claim 7, wherein the palm protection portion comprises a stitching pattern attaching the palm protection portion to the glove body, the stitching pattern comprising at least one of:
    a lateral stitching band;
    a longitudinal stitching band;
    outer stitching located at the edges of the palm protection portion;
    finger base stitching; and
    palm stitching comprising at least one stitching loop.

11. The glove of claim 1, wherein a palmar side of at least one of the plurality of finger portions comprises a fourth material, wherein the fourth material is configured to interact with a touchscreen.

12. The glove of claim 1, wherein the first material permits water vapor to travel between the glove body and an exterior of the glove.

* * * * *